United States Patent [19]

Miyamoto et al.

[11] Patent Number: 5,011,893

[45] Date of Patent: Apr. 30, 1991

[54] METHOD FOR PRODUCING A BLOCK COPOLYAMIDE

[75] Inventors: Masaaki Miyamoto; Hidemi Nakanishi; Takayoshi Tanaka, all of Kitakyushu, Japan

[73] Assignee: Mitsubishi Kasei Corporation, Tokyo, Japan

[21] Appl. No.: 390,217

[22] Filed: Aug. 7, 1989

[30] Foreign Application Priority Data

Aug. 17, 1988 [JP] Japan ................................ 63-203195

[51] Int. Cl.$^5$ ............................................. C08L 77/00
[52] U.S. Cl. .................................. 525/420.5; 525/432
[58] Field of Search ............................. 525/432, 420.5

[56] References Cited

U.S. PATENT DOCUMENTS 4,196,108  4/1980  Hinze et al. ...................... 525/420.5
4,740,582  4/1988  Coquard et al. ................... 525/432

Primary Examiner—Ana L. Carrillo
Attorney, Agent, or Firm—Oblon, Spivak, McClelland, Maier & Neustadt

[57] ABSTRACT

A method for producing a block copolyamide, which comprises polycondensing a prepolymer prepared from a dimerized fatty acid and a diamine and having a number average molecular weight of from 1,000 to 50,000, with a polyamide material other than said prepolymer component or a prepolymer thereof.

5 Claims, 1 Drawing Sheet

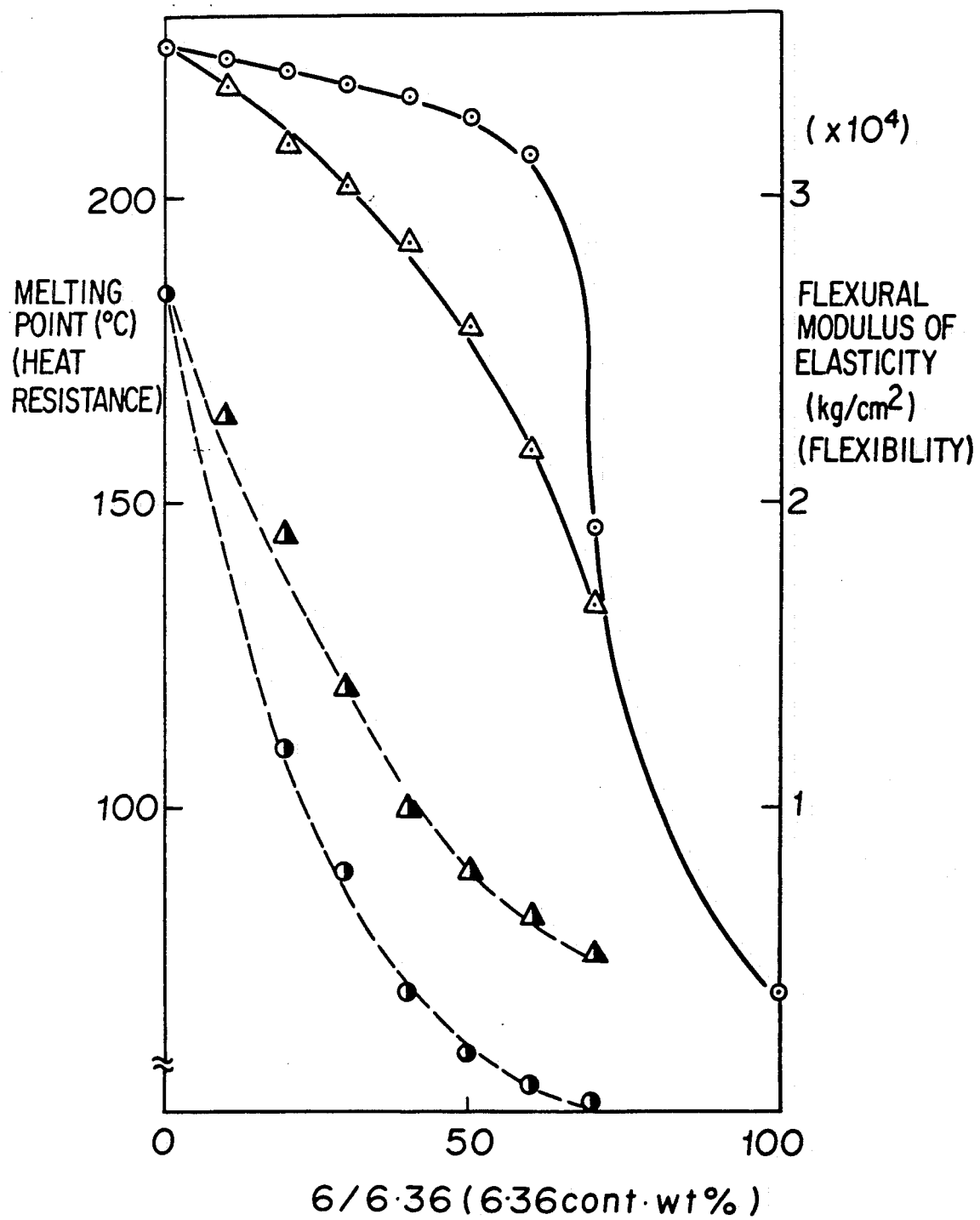

METHOD FOR PRODUCING A BLOCK COPOLYAMIDE

The present invention relates to a method for producing a block copolyamide. More particularly, it relates to a method for producing a block copolyamide excellent in various properties such as flexibility, heat resistance and chemical resistance.

As a polyamide having excellent flexibility, a copolyamide wherein a dimerized fatty acid is used as a copolymer component, is known (Japanese Unexamined Patent Publication No. 71191/1979). However, if the amount of the dimerized fatty acid is increased to increase the flexibility, the heat resistance tends to decrease, whereby it has been difficult to simultaneously satisfy the heat resistance and the flexibility. A further improvement has been desired in this respect.

The present inventors have conducted extensive researches to solve such a problem, and as a result, have found it possible to obtain a block copolyamide having the flexibility improved without impairing the heat resistance intrinsic to a polyamide, by using a prepolymer prepared from a dimerized fatty acid and a diamine and by polycondensing such a prepolymer with a polyamide material other than the prepolymer component or with a prepolymer of such a polyamide material. The present invention has been accomplished on the basis of this discovery.

It is therefore an object of the present invention to obtain a block copolyamide excellent in the flexibility and having a high industrial value. Such an object can be attained by a method for producing a block copolyamide, which comprises polycondensing a prepolymer prepared from a dimerized fatty acid and a diamine and having a number average molecular weight of from 1,000 to 50,000, with a polyamide material other than said prepolymer component or a prepolymer thereof.

Now, the present invention will be described in detail with reference to the preferred embodiments.

In the accompanying drawings, the FIGURE is a graph showing the relation between the proportions of the starting materials and the melting point and flexural modulus of elasticity of a block copolymer and a random copolymer.

As the dimerized fatty acid to be used in the present invention, a polymerized fatty acid obtained by polymerizing an unsaturated fatty acid, such as a monobasic fatty acid from natural oil and fat or a synthetic monobasic fatty acid having from 8 to 24 carbon atoms and containing at least one double bond or triple bond. As a specific example, a dimer of linolenic acid, linolic acid, oleic acid or tall oil fatty acid, may be mentioned.

Commercially available polymerized fatty acids usually comprise a dimerized fatty acid as the main component and starting material fatty acids or trimerized fatty acids as additional components. The dimerized fatty acid content is preferably at least 70% by weight, more preferably at least 95% by weight and most preferably at least 98% by weight. Commercial products are also called dimer acids.

Commercially available polymerized fatty acids may be distilled to increase the dimerized fatty acid content before use. In some cases, they may be hydrogenated to lower the degree of unsaturation before use.

The diamine to be used together with the dimerized fatty acid for the preparation of the prepolymer, includes diamines such as ethylenediamine, 1,4-diaminobutane, hexamethylenediamine, nonamethylenediamine, undecamethylenediamine, dodecamethylenediamine, 2,2,4- or 2,4,4-trimethylhexamethylenediamine, bis-(4,4'-aminocyclohexyl)methane and m-xylylenediamine. For the preparation of the prepolymer from the dimerized fatty acid and the diamine, a usual process for the production of a polyamide may be followed, for example, by charging the dimerized fatty acid, the diamine and water to a pressure container, heating them to initiate the reaction and terminating the reaction when a desired number average molecular weight has been reached.

The number average molecular weight of the prepolymer prepared from the dimerized fatty acid and the diamine is required to be within a range of from 1,000 to 50,000, preferably from 2,000 to 30,000, more preferably from 3,000 to 20,000, as measured by a quantitative analysis of terminal groups. With respect to the terminal groups to be determined by the quantitative analysis of terminal groups, for example, amino groups are measured by dissolving the polyamide in phenol, followed by titration with 0.05N hydrochloric acid, and carboxyl groups are measured by dissolving the polyamide in benzyl alcohol, followed by titration with 0.1N sodium hydroxide, whereupon the sum of the two groups may be taken as the total terminal groups.

If the number average molecular weight is lower than the above range, the block copolyamide tends to be hardly formed, and it becomes difficult to obtain a product which simultaneously satisfies the flexibility and the heat resistance. On the other hand, if the number average molecular weight is higher than the above range, it tends to take a long time for the preparation of the prepolymer from the dimerized fatty acid and the diamine.

In the present invention, the prepolymer prepared from the above-mentioned dimerized fatty acid and diamine, is polycondensed with a polyamide material other than the prepolymer component or a prepolymer thereof.

The polyamide material used here may be a at least three-membered ring lactam, a polymerizable ω-amino acid or a salt obtained by the reaction of a dibasic acid with a diamine. Specific examples of the starting materials for such polyamides, include lactams such as ε-caprolactam, enantholactam, capryllactam, lauryllactam, α-pyrrolidone and α-piperidone; ω-amino acids such as 6-aminocaproic acid, 7-aminocaproic acid, 9-aminononanoic acid and 11-aminoundecanoic acid; dibasic acids such as adipic acid, glutaric acid, pimelic acid, suberic acid, azelaic acid, sebacic acid, undecadioic acid, dodecadioic acid, hexadecadioic acid, hexadecenedioic acid, eicosanedioic acid, eicosadienedioic acid, diglycolic acid, 2,2,4-trimethyladipic acid, xylenedicarboxylic acid, 1,4-cyclohexanedicarboxylic acid, terephthalic acid, and isophthalic acid; and diamines such as hexamethylenediamine, tetramethylenediamine, nonamethylenediamine, undecamethylenediamine, dodecamethylenediamine, 2,2,4- or 2,4,4-trimethylhexamethylenediamine, bis-(4,4'-aminocyclohexyl)methane and metaxylylenediamine.

For the production of the block copolyamide of the present invention, the prepolymer prepared from the dimerized fatty acid and the diamine, and the polyamide material other than said prepolymer component or a prepolymer thereof, are charged in a polymerization reactor, followed by polymerization in accordance with a usual process for the production of a polyamide.

The content of the dimerized fatty acid in the block copolyamide is usually from 1 to 80% by weight, preferably from 10 to 70% by weight. If the content is too low, no adequate flexibility tends to be obtained to meet various applications. On the other hand, if the content is too high, the heat resistance tends to be inadequate, such being unsuitable as engineering plastics of general use.

The block copolyamide of the present invention usually has a number average molecular weight of 15,000 to 40,000 and is a polymer having several prepolymer units formed from the dimerized fatty acid and the diamine, in one molecular chain, as shown in the following structure, although the number of the units varies depending upon the composition of the charged dimerized fatty acid:

wherein —CO—D—CO— represents the dimerized fatty acid moiety.

For example, when a prepolymer of $\overline{M}n=1,300$ is polymerized in caprolactam by charging 50% by weight of caprolactam and 50% by weight of dimerized fatty acid + diamine to obtain a block copolyamide of $\overline{M}n = 20,000$, $z = 2$, $y = 7.5$, $X = 88.4$, and thus the product is 6-nylon having an average number of 7.5 prepolymer units introduced per molecular chain as calculated on the assumption that the prepolymer prepared from the dimerized fatty acid and the diamine undergoes no amide exchange reaction. However, in practice, an amide exchange reaction takes place to some extent, and the prepolymer once formed from the dimerized fatty acid and the diamine may undergo a molecular weight reduction. However, a block copolyamide obtained by controlling such an exchange reaction undergoes little reduction of the melting point, has excellent heat resistance and exhibits superior flexibility as compared with a random copolymer having the same composition. The amide exchange reaction can be suppressed by controlling the time under a high pressure condition during the polymerization.

The feature of the present invention resides in that the copolymerization is carried out with a block unit z of at least 1.5, and x and z are copolymerized as blocks, whereby it is possible to obtain a copolymer having the merits of the two components, which used to be hardly attainable by the conventional copolymerization. For example, with the conventional copolyamides, the numerical value for z is not large enough.

The block copolyamide produced by the method of the present invention can be molded by various molding methods including injection molding, extrusion molding, blow molding and compression molding. In particular, tubes such as fuel tubes, brake pipings or exhaust gas parts, pipes, sheets, electric parts such as connectors, gears, valves, oil pans, cooling fans, radiator tanks, cylinder heads, canisters, obtained by extrusion molding or injection molding, are very useful. Further, secondly processing such as vapor deposition may be applied to the molded products thus obtained.

To the block copolyamide produced by the method of the present invention, conventional additives including reinforcing materials such as glass fibers or carbon fibers, fillers such as clay, silica, alumina, silica alumina, silica magnesia, glass beads, graphite or gypsum, dyes and pigments, flame retardants, antistatic agents and antioxidants, may be incorporated.

Now, the present invention will be described in further detail with reference to Examples. However, it should be understood that the present invention is by no means restricted to such specific Examples.

In the Examples and Comparative Examples, the physical property values were measured in accordance with the following methods.

(1) Relative viscosity: Measured by means of an Ubbellode viscometer at 25° C. with respect to a solution containing 1 g of the polyamide in 100 ml of m-cresol.

$\eta_{rel.} = t/t_0$ t = flow time of solution (sec)

$t_0$ = flow time of pure solvent (sec)

(2) Melting point: Measured by means of a differential micro-calorimeter under a temperature change of 20° C./min.

(3) Flexural properties: ASTM D790

(4) Shore D hardness: ASTM D2240

EXAMPLES 1 to 5

Charged into a 200 l autoclave were a dimerized fatty acid (dimer: 98%, monomer: 0.1%, trimer: 1%, Plypol 1009, manufactured by Unichema Co.) and hexamethylenediamine in the respective amounts as identified in Table 1 and water in an amount to make up an aqueous solution containing 75% by weight of a salt of the dimerized fatty acid with the diamine. After flushing with nitrogen, the reaction was conducted for one hour at the internal temperature under the internal pressure as identified in Table 1 to obtain a prepolymer having the number average molecular weight as identified in Table 1.

This prepolymer was introduced into ω-caprolactam in the amount as identified in Table 1 heated to 250° C., and the reaction was conducted for one hour at an internal temperature of 280° C. under an internal pressure of 8 kg/cm$^2$G (i.e. gage pressure). Then, the pressure was reduced to a level as identified in Table 1, and the polycondensation reaction was conducted for one hour.

Nitrogen was introduced to bring the internal pressure to atmospheric pressure, and the product was withdrawn in the form of a strand and then pelletized. After removing unreacted monomers by extraction with boiling water, the product was dried. The physical properties of the block copolyamide thus obtained are shown in Table 1.

COMPARATIVE EXAMPLE 1 and 2

For the comparison with Examples 1 and 2, prepolymers having low number average molecular weights were prepared by lowering the internal temperature and the internal pressure during the preparation of the prepolymer from the dimerized fatty acid and hexamethylenediamine. By using such prepolymers, polycondensation reactions were conducted in the same manner as in Examples 1 and 2.

The physical properties of the block copolyamides thus obtained are shown in Table 1.

EXAMPLE 6

Under the condition as identified in Table 2, a prepolymer having the number average molecular weight as identified in Table 2 was prepared from a dimerized fatty acid and hexamethylenediamine. On the other hand, an aqueous solution containing 50% by weight of a salt (AH salt) of adipic acid with hexamethylenediamine was concentrated under an internal pressure of 2.5 kg/cm²G at an internal temperature of 160° C. to a level of from 75 to 80% by weight. Into this solution, the above-mentioned prepolymer was introduced, and the reaction was conducted for one hour at an internal temperature of 250° C. under an internal pressure of 13 kg/cm²G. Then, in the same manner as in Example 1, a block copolyamide was prepared.

The physical properties of the block copolyamide thus obtained are shown in Table 2.

COMPARATIVE EXAMPLE 3

For the comparison with Example 6, a prepolymer having a low number average molecular weight was prepared by lowering the internal temperature and the internal pressure during the preparation of the prepolymer from the dimerized fatty acid and hexamethylenediamine. By using this prepolymer, the polycondensation reaction was conducted in the same manner as in Example 6.

The physical properties of the block copolyamide thus obtained are shown in Table 2.

In Tables 1 and 2, the evaluation of the heat resistance was in accordance with the following standards.

(a) Evaluation of heat resistance:
Where the melting point is Tm° C.;
O: Tm ≧ 210° C.
Δ: 190° C. ≦ Tm < 210° C.
X: Tm < 190° C.

TABLE 1

| | | Example 1 | Comparative Example 1 |
|---|---|---|---|
| Plypol 1009 (wt %) | | 41.55 | 41.55 |
| Diamine (wt %) | | Hexamethylene diamine 8.45 | Hexamethylene diamine 8.45 |
| Polymerization conditions for prepolymer | Internal temp. (°C.) | 220 | 140 |
| | Internal pressure (kg/cm²G) | 10 | 6 |
| Number average molecular weight of prepolymer | | 2100 | 340 |
| Polyamide material | | Caprolactam 50 | Caprolactam 50 |
| Reduced pressure during polymerization (mmHg) | | 190 | 210 |
| Measured values | Relative viscosity | 1.74 | 1.80 |
| | Melting point (°C.) | 205 | 178 |
| Heat resistance | | Δ | X |
| Flexural strength (kg/cm²) | | 370 | 390 |
| Flexural modulus of elasticity (kg/cm²) | | 9400 | 10400 |
| Shore D hardness | | 63 | 68 |

| | | Example 2 | Comparative Example 3 |
|---|---|---|---|
| Plypol 1009 (wt %) | | 24.93 | 24.93 |
| Diamine (wt %) | | Hexamethylene diamine 5.07 | Hexamethylene diamine 5.07 |
| Polymerization conditions for prepolymer | Internal temp. (°C.) | 240 | 140 |
| | Internal pressure (kg/cm²G) | 5 | 6 |
| Number average molecular weight of prepolymer | | 4000 | 340 |
| Polyamide material | | Caprolactam 70 | Caprolactam 70 |
| Reduced pressure during polymerization (mmHg) | | 160 | 160 |
| Measured values | Relative viscosity | 2.05 | 2.10 |
| | Melting point (°C.) | 218 | 202 |
| Heat resistance | | | Δ |
| Flexural strength (kg/cm²) | | 540 | 650 |
| Flexural modulus of elasticity (kg/cm²) | | 13900 | 17300 |
| Shore D hardness | | 72 | 76 |

| | | Example 3 | Example 4 | Example 5 |
|---|---|---|---|---|
| Plypol 1009 (wt %) | | 58.17 | 24.93 | 24.22 |
| Diamine (wt %) | | Hexamethylene diamine 11.83 | Hexamethylene diamine 5.07 | m-xylylene diamine 5.78 |
| Polymerization conditions for prepolymer | Internal temp. (°C.) | 220 | 220 | 220 |
| | Internal pressure (kg/cm²G) | 10 | 10 | 10 |
| Number average molecular weight of prepolymer | | 2100 | 2100 | 2100 |
| Polyamide material | | Caprolactam 30 | Caprolactam 70 | Caprolactam 70 |
| Reduced pressure during polymerization (mmHg) | | 100 | 520 | 200 |
| measured values | Relative viscosity | 1.82 | 1.69 | 1.70 |
| | Melting point (°C.) | 190 | 216 | 217 |
| Heat resistance | | Δ | | |
| Flexural strength (kg/cm²) | | 240 | 550 | 550 |
| Flexural modulus of elasticity (kg/cm²) | | 6100 | 14500 | 14300 |
| Shore D hardness | | 60 | 73 | 73 |

TABLE 2

| | | Example 6 | Comparative Example 3 |
|---|---|---|---|
| Plypol 1009 (wt %) | | 49.85 | 49.85 |
| Diamine (wt %) | | Hexamethylene diamine 10.15 | Hexamethylene diamine 10.15 |
| Polymerization conditions for prepolymer | Internal temp. | 200 | 140 |
| | Internal pressure (kg/cm²G) | 9 | 6 |
| Number average molecular weight of prepolymer | | 1300 | 340 |
| Polyamide material | | AH salt 40 | AH salt 40 |
| Reduced pressure during polymerization (mmHg) | | 120 | 140 |
| Measured values | Relative viscosity | 1.72 | 1.71 |
| | Melting point (°C.) | 225 | 204 |
| Heat resistance | | | Δ |
| Flexural strength (kg/cm²) | | 520 | 550 |
| Flexural modulus of elasticity (kg/cm²) | | 13800 | 14200 |
| Shore D hardness | | 74 | 71 |

EXAMPLES 7 to 9

Charged into a 200 l autoclave, a dimerized fatty acid (dimer: 96%, monomer: 1%, trimer: 3%, Enpol #1010, tradename, manufactured by Emery Co.) and hexamethylenediamine in the respective amounts as identified in Table 3 and water in an amount to make up an aqueous solution containing 75% by weight of a salt of the dimerized fatty acid with the diamine. After flushing with nitrogen, the reaction was conducted for one hour at an internal temperature of 240° C. under an internal pressure of 13 kg. Then, the pressure was reduced to 50 Torr, and the reaction was conducted under reduced pressure to obtain a prepolymer having the number average molecular weight as identified in Table 3.

This prepolymer was introduced into ε-caprolactam in the amount as identified in Table 3 heated to 250° C., and 1.5%, based on ε-caprolactam, of water was added thereto. Then, the reaction was conducted for 0.5 hour at an internal temperature of 260° C. under an internal pressure of 4 kg/cm$^2$G. Then, the pressure was reduced to a level as identified in Table 3, and the polycondensation reaction was conducted for 2 hours.

The subsequent operation was conducted in the same manner as in Examples 1 to 5.

COMPARATIVE EXAMPLES 4 to 6

For the comparison with Examples 7 to 9, prepolymers having low number average molecular weights were prepared by lowering the internal temperature during the preparation of the prepolymer. By using such prepolymers, the polycondensation reaction was conducted in the same manner as in Examples 7 to 9.

The results are shown in Table 3.

TABLE 3

| | Example 7 | Comparative Example 4 |
|---|---|---|
| Enpol #1010 (wt %) | 33.24 | 33.24 |
| Diamine (wt %) | Hexamethylene diamine 6.76 | Hexamethylene diamine 6.76 |
| Number average molecular weight of prepolymer | 31300 | 340 |
| Polyamide material | Caprolactam 60 | Caprolactam 60 |
| Reduced pressure during polymerization (mmHg) | 150 | 220 |
| Measured values — Relative viscosity | 1.73 | 1.72 |
| Measured values — Melting point (°C.) | 217 | 193 |
| Heat resistance | | Δ |
| Flexural strength (kg/cm$^2$) | 170 | 330 |
| Flexural modulus of elasticity (kg/cm$^2$) | 3800 | 9600 |
| Shore D hardness | 56 | 56 |

| | Example 8 | Comparative Example 5 |
|---|---|---|
| Enpol #1010 (wt %) | 41.55 | 41.55 |
| Diamine (wt %) | Hexamethylene diamine 8.45 | Hexamethylene diamine 8.45 |
| Number average molecular weight of prepolymer | 31300 | 340 |
| Polyamide material | Caprolactum 50 | Caprolactum 50 |
| Reduced pressure during polymerization (mmHg) | 150 | 220 |
| Measured values — Relative viscosity | 1.76 | 1.75 |
| Measured values — Melting point (°C.) | 150 | 220 |
| Heat resistance | | X |
| Flexural strength (kg/cm$^2$) | 120 | 270 |
| Flexural modulus of elasticity (kg/cm$^2$) | 2100 | 8200 |
| Shore D hardness | 52 | 62 |

| | Example 9 | Comparative Example 6 |
|---|---|---|
| Enpol #1010 (wt %) | 49.85 | 49.85 |
| Diamine (wt %) | Hexamethylene diamine 10.15 | Hexamethylene diamine 10.15 |
| Number average molecular weight of prepolymer | 31300 | 340 |
| Polyamide material | Caprolactum 40 | Caprolactum 40 |
| Reduced pressure during polymerization (mmHg) | 120 | 200 |
| Measured values — Relative viscosity | 1.78 | 1.78 |
| Measured values — Melting point (°C.) | 207 | 159 |
| Heat resistance | Δ | X |
| Flexural strength (kg/cm$^2$) | 70 | 230 |
| Flexural modulus of elasticity (kg/cm$^2$) | 1100 | 6200 |
| Shore D hardness | 48 | 60 |

The process of the present invention is industrially very advantageous in that it is thereby possible to produce a block copolyamide which is excellent in various properties such as heat resistance, chemical resistance and flexibility.

What is claimed is:

1. A method for producing a block copolyamide, which comprises polycondensing a prepolymer prepared from a dimerized fatty acid and a diamine and having a number average molecular weight of from 1,000 to 50,000, with a polyamide material other than said prepolymer component wherein said polyamide material is an at least three-membered ring lactam, a polymerizable ω-amino acid or a salt obtained by the reaction of a dibasic acid with a diamine or a prepolymer of said polyamide material.

2. The method according to claim 1, wherein the dimerized fatty acid is a polymerized fatty acid obtained by polymerizing an unsaturated fatty acid.

3. The method according to claim 1, wherein the dimerized fatty acid is a dimer of linolenic acid, linolic acid, oleic acid or tall oil fatty acid.

4. The method according to claim 1, wherein the diamine is ethylenediamine, 1,4-diaminobutane, hexamethylenediamine, nonamethylenediamine, undecamethylenediamine, dodecamethylenediamine, 2,2,4- or 2,4,4-trimethylhexamethylenediamine, bis-(4,4'-aminocyclohexyl)methane or m-xylylenediamine.

5. The method according to claim 1, wherein the prepolymer has a number average molecular weight of from 2,000 to 30,000.

* * * * *